United States Patent
Mao et al.

(10) Patent No.: US 11,125,299 B1
(45) Date of Patent: Sep. 21, 2021

(54) SELF-VARIABLE FORCE HYDRAULIC DAMPER

(71) Applicant: Ningbo Kasico Shock Absorber Manufacture Co., Ltd., Zhejiang (CN)

(72) Inventors: Lina Mao, Zhejiang (CN); Rong Li, Zhejiang (CN)

(73) Assignee: Ningbo Kasico Shock Absorber Manufacture Co., Ltd., Ningbo (CN)

( * ) Notice: Subject to any disclaimer, the term of this patent is extended or adjusted under 35 U.S.C. 154(b) by 0 days.

(21) Appl. No.: 17/319,072

(22) Filed: May 12, 2021

Related U.S. Application Data

(63) Continuation of application No. PCT/CN2021/088294, filed on Apr. 20, 2021.

(30) Foreign Application Priority Data

Apr. 26, 2020 (CN) .......................... 202020646451.3
Sep. 22, 2020 (CN) .......................... 202011003752.5

(51) Int. Cl.
*F16F 9/34* (2006.01)
*F16F 9/348* (2006.01)
*F16F 9/19* (2006.01)
*H02S 20/30* (2014.01)

(52) U.S. Cl.
CPC .............. *F16F 9/3481* (2013.01); *F16F 9/19* (2013.01); *F16F 9/3484* (2013.01); *H02S 20/30* (2014.12); *F16F 2228/066* (2013.01)

(58) Field of Classification Search
CPC .......... F16F 9/3481; F16F 9/19; F16F 9/3484; F16F 9/362; F16F 9/363; F16F 9/364; F16F 2228/066; H02S 20/30

USPC .......................... 188/322.15, 322.16, 322.17
See application file for complete search history.

(56) References Cited

U.S. PATENT DOCUMENTS

| | | | | |
|---|---|---|---|---|
| 4,484,669 | A * | 11/1984 | Kato ...................... | F16F 9/348 137/513.3 |
| 4,953,671 | A * | 9/1990 | Imaizumi ................ | F16F 9/464 188/282.3 |
| 5,129,635 | A * | 7/1992 | Holley ................... | F16F 9/0209 188/322.17 |
| 5,730,263 | A * | 3/1998 | Grundei ................ | F16F 9/3214 188/322.18 |
| 6,079,440 | A * | 6/2000 | Fenn ...................... | F16F 9/3214 137/493.9 |
| 9,347,512 | B2 * | 5/2016 | Yamada ................ | F16F 9/3214 |
| 2007/0051574 | A1 * | 3/2007 | Keil ....................... | F16F 9/364 188/322.18 |

(Continued)

*Primary Examiner* — Xuan Lan Nguyen

(57) ABSTRACT

A self-variable force hydraulic damper including a housing assembly, a piston rod and a piston assembly. The piston assembly is mounted on the piston rod and includes a first washer, a first disc spring, a first valve plate, a variable displacement piston, a second valve plate, a second disc spring and a second washer; the piston has a first end face and a second end face, and is further provided with a first flow hole and a second flow hole penetrating the first end face and the second end face respectively; the first valve plate is pressed against the first end face, and the first valve plate closes the first flow hole and does not close the second flow hole; the second valve plate is pressed against the second end face, and the second valve plate closes the second flow hole and does not close the first flow hole.

8 Claims, 9 Drawing Sheets

(56) References Cited

U.S. PATENT DOCUMENTS

2010/0326781 A1* 12/2010 Kim ..................... F16F 9/5126
                                                              188/322.15

* cited by examiner

A

SELF-VARIABLE FORCE HYDRAULIC DAMPER

CROSS-REFERENCE TO RELATED APPLICATION

The present application is a continuation of international application of PCT application No. PCT/CN2021/088294 filed on Apr. 20, 2021, which claims the priority benefits of China application No. 202011003752.5 filed on Sep. 22, 2020 and China application No. 202020646451.3 filed on Apr. 26, 2020. The entirety of the above-mentioned patent applications is incorporated herein by reference and made a part of this specification.

BACKGROUND

Technical Field

The present application relates to the field of a shock absorber, and in particular, to a hydraulic damper.

Description of Related Art

In the solar photovoltaic power generation system, a solar photovoltaic panel automatically tracks following the solar radiation angle under a program set by a tracker. A hydraulic damper is applied in the solar photovoltaic power generation system to support the solar photovoltaic panel and also buffer wind shocks. The hydraulic damper currently used in the solar photovoltaic power generation system is usually capable of buffering wind shocks caused by high winds of force seven to force eight.

With regard to the above-mentioned related technologies, the inventor believes that when the solar photovoltaic power generation system faces high winds of a higher scale, the above hydraulic damper cannot buffer the wind shocks generated by high winds of such scale.

SUMMARY

In order to improve the ability of a hydraulic damper to buffer wind shocks, the present application proposes for a self-variable force hydraulic damper.

The present application proposes for a self-variable force hydraulic damper, adopting the following technical solutions.

A self-variable force hydraulic damper for a solar photovoltaic power generation system including a housing assembly, a piston rod and a piston assembly, the piston assembly is mounted on the piston rod and sequentially includes a first washer, a first disc spring, a first valve plate, a variable displacement piston, a second valve plate, a second disc spring and a second washer; the variable displacement piston has a first end face and a second end face, and is further provided with a first flow hole and a second flow hole that penetrate the first end face and the second end face respectively; the first valve plate under the action of the first disc spring is pressed against the first end face, and the first valve plate closes the first flow hole and does not close the second flow hole; the second valve plate under the action of the second disc spring is pressed against the second end face, and the second valve plate closes the second flow hole and does not close the first flow hole.

By adopting the above technical solution, the above self-variable force hydraulic damper is supported on the solar photovoltaic panel, the piston rod of the self-variable force hydraulic damper has different actions with the rotation of the solar photovoltaic panel, that is, the piston rod is compressed or stretched. Here, when the piston rod moves toward the tail end of the housing assembly, it is defined as the piston rod is compressed, and when the piston rod moves toward the front end of the housing assembly, it is defined as the piston rod is stretched.

When the solar photovoltaic panel connected with the above self-variable force hydraulic damper is subjected to wind, the wind energy pressure acting on the solar photovoltaic panel is converted into a stretch force or a compressive force applied to the piston rod. At this time, the first valve plate or the second valve plate under the action of the hydraulic oil will overcome the action of the pressure of the first disc spring or the second disc spring, so that the first disc spring and the second disc spring will be deformed, causing a damping force of the above-mentioned self-variable force hydraulic damper increases. When the above-mentioned self-variable force hydraulic damper is subjected to a larger wind, the first disc spring and the second disc spring can be completely elastically deformed and adhere closely to the surface of the first valve plate or the second valve plate, so that the self-variable force hydraulic damper has a larger damping force at this time, which improves the ability of the hydraulic damper to buffer wind shocks.

Alternatively, a first tapered surface of the first disc spring is directed towards the first valve plate; a second tapered surface of the second disc spring is directed towards the second valve plate.

By adopting the above technical solution, when the solar photovoltaic panel connected with the above self-variable force hydraulic damper is subjected to wind, the edge area in the first valve plate and the second valve plate corresponding to the first flow hole or the second flow hole can be deformed, so that a gap is formed between the first valve plate and the variable displacement piston or between the second valve plate and the variable displacement piston, and the hydraulic oil can be circulated through the gap to meet the demand for the hydraulic oil flow in this state, and the buffering effect of the above-mentioned self-variable force hydraulic damper is improved.

At this time, the first valve plate urges the first disc spring to deform, or the second valve plate urges the second disc spring to deform, which enhances the damping force of the self-variable force hydraulic damper.

Alternatively, a first throttle groove for a fluid within the first flow hole flowing out is provided on the first valve plate; a second throttle groove for a fluid within the second flow hole flowing out is provided on the second valve plate.

By adopting the above technical solution, when the self-variable force hydraulic damper is in a calm or breeze state, when the piston rod moves synchronously with the rotation of the solar photovoltaic panel, the speed of the piston rod is lower at this time, and the circulating amount of the hydraulic oil in the housing assembly is small, so that the first valve plate and the second valve plate do not need to be deformed. The setting of the first throttle groove and the second throttle groove can meet the needs of the hydraulic oil circulation, so that the above-mentioned self-variable force hydraulic damper has more stable flow of the hydraulic oil through the variable displacement piston in the calm or breeze state, so that the damping force provided by the self-variable force hydraulic damper is more stable and the damping performance of the self-variable force hydraulic damper is improved.

Alternatively, the first valve plate is formed by at least two stacked first individual plates, the first individual plate attaching with the variable displacement piston among the first individual plates is provided with a first throttle notch; the second valve plate is formed by at least two stacked second individual plates, the second individual plate attaching with the variable displacement piston among the second individual plates is provided with a second throttle notch.

By adopting the above technical solution, by controlling the thickness of the first valve plate and/or the second valve plate, thus controlling the circulating area of the first throttle groove and/or the second throttle groove, and thus controlling the flow of the hydraulic oil through the variable displacement piston in the calm or breeze state, the damping force provided by the self-variable force hydraulic damper is more stable.

The structure of the first valve plate and the second valve plate is set, so that the structural strength of the first valve plate and the second valve plate is more ideal, which reduces the probability of damage of the first valve plate caused by the extrusion of the first disc spring during the deformation of the first disc spring, and helps to extend the service life of the first disc shaped valve plate; also reduces the probability of damage of the second valve plate caused by the extrusion of the second disc spring during the deformation of the second disc spring, and helps to extend the service life of the second disc shaped valve plate.

Alternatively, the first flow hole is an oblique hole and arranged inclinedly outwardly along a direction from the first end face to the second end face; the second flow hole is also an oblique hole and arranged inclinedly outwardly along a direction from the second end face to the first end face.

By adopting the above technical solution, the defined factor is satisfied that the first flow hole is closed by the first valve plate at the first end face and is not closed by the second valve plate at the second end face, and the second flow hole is not closed by the second valve plate at the first end face and is closed by the second flow hole at the second end face, a first flow hole and the second flow hole is an oblique hole are set, is simple in structure and convenient to be machined.

Alternatively, the variable displacement piston is provided with a first ring groove on the first end face, the first flow hole is communicated with the inner wall of the first ring groove, the first throttle groove is communicated with the first ring groove, and the first valve plate closes the first ring groove;
the variable displacement piston is provided with a second ring groove on the second end face, the second flow hole is communicated with the inner wall of the second ring groove, the second throttle groove is communicated with the second ring groove, and the second valve plate closes the second ring groove.

By adopting the above technical solution, the setting of the first ring groove and the second ring groove makes the action force of the hydraulic oil acting on the first valve plate and the second valve plate relatively uniform. While the edge area of the first valve plate/the second valve plate is deformed, the first valve plate/the second valve plate squeezes the first disc spring or the second disc spring under the action of uniform hydraulic pressure force, and thus the deformation of the first disc spring and the second disc spring is more uniform, which helps to improve the internal stability of the piston assembly, and in the process of external wind sudden changes, the above-mentioned self-variable force hydraulic damper can make a fast and stable response, thereby helping to reduce the probability of internal failure of the self-variable hydraulic damper.

Alternatively, the tail end of the piston rod has a mounting section for mounting the piston assembly, a stepped surface is formed at the top end of the mounting section, the piston rod is further provided with a mounting nut for pressing the piston assembly on the stepped surface.

By adopting the above technical solution, the structure of the piston assembly mounted on the tail end of the piston rod is simple, easy to assemble, and there is a little probability of the piston assembly falling off the tail end of the piston rod.

Alternatively, the housing assembly includes an outer cylinder, a bottom cover mounted at the tail end of the outer cylinder, a front cover mounted at the front end of the outer cylinder, a guide seal assembly for guiding the piston rod mounted at the front end of the outer cylinder, and a working cylinder located within the outer cylinder and cooperated with the piston assembly; the lower end of the working cylinder is mounted with a compression valve, and an oil storage cavity is formed between the working cylinder and the outer cylinder; the guide seal assembly has a first through hole for the extension of the piston rod, and is sequentially provided with a first guide sleeve, an oil seal and a second guide sleeve at the inner wall of the first through hole along the extension direction of the piston rod.

By adopting the above technical solution, since the above self-variable hydraulic damper has high requirements for the sliding accuracy of the piston rod and the piston assembly, the provision of the first guide sleeve and the second guide sleeve in the guide seal assembly helps to ensure the sliding accuracy of the piston rod.

Alternatively, the guide seal assembly is further provided with an oil return ring groove between the first guide sleeve and the oil seal, and the guide seal assembly is further provided with an oil return hole communicating the oil return ring groove and the oil storage cavity.

By adopting the above technical solution, when the piston rod is stretched out of the housing assembly, a part of the hydraulic oil remaining in the piston rod will sequentially pass through the first guide sleeve, the oil seal and the second guide sleeve in, and a portion of the hydraulic oil will be blocked by the first guide sleeve and remains in the working cylinder. The hydraulic oil passing through the first guide sleeve will be scraped off by the oil seal and replenished to the oil storage cavity through the oil return ring groove and the oil return hole. And, the hydraulic oil in the oil storage cavity can be compensated into the working cylinder through the compression valve, which helps to recover the hydraulic oil scraped off by the oil seal.

Alternatively, the guide seal assembly includes a first guide sealingly mounted at the inner cavity of the outer cylinder and the second guide mounted at the inner cavity of the outer cylinder and located outside of the first guide; the first guide has a first insert portion inserted within the working cylinder, and a first guide groove for mounting the first guide sleeve is provided on the end face of the first insert portion; a positioning insert groove is provided on the end of the first guide directed towards the second guide and having the second guide provided, and the bottom of the positioning insert groove is provided with an oil seal ring groove for mounting the oil seal; the second guide has the second insert portion inserted within the positioning insert groove, and the second guide groove for mounting the second guide sleeve is provided on the end face of the second insert portion towards the first guide.

By adopting the above technical solution, not only the mounting of the first guide sleeve, the oil seal and the second guide sleeve is convenient, the coordination and definition between the first guide and the outer cylinder, between the second guide and the outer cylinder, and between the first guide and the second guide but also help to improve the sliding accuracy of the guide seal assembly to the piston rod, so that the piston assembly moves more smoothly in the working cylinder.

In summary, the present application includes at least beneficial technical effect as follows.

1. When the above-mentioned self-variable force hydraulic damper is subjected to a larger wind, the first disc spring and the second disc spring can be completely elastically deformed and adhere closely to the surface of the first valve plate or the second valve plate, so that the self-variable force hydraulic damper has a larger damping force at this time, which improves the ability of the hydraulic damper to buffer wind shocks;

2. In a calm or breeze state, the piston rod moves synchronously with the rotation of the solar photovoltaic panel, the speed of the piston rod is lower at this time, and the circulating amount of the hydraulic oil in the housing assembly is small, so that the setting of the first throttle groove and the second throttle groove can meet the needs of the hydraulic oil circulation, so that the damping force provided by the self-variable force hydraulic damper is more stable and the damping performance of the self-variable force hydraulic damper is improved;

3. The first ring groove and the second ring groove provided on the variable displacement piston makes the action force of the hydraulic oil acting on the first valve plate and the second valve plate relatively uniform, which helps to improve the internal stability of the piston assembly, and in the process of external wind sudden changes, the above-mentioned self-variable force hydraulic damper can make a fast and stable response, thereby helping to reduce the probability of internal failure of the self-variable hydraulic damper.

DESCRIPTION OF THE EMBODIMENTS

The present application will be described in further detail below with reference to FIGS. 1-9.

Figure 1:
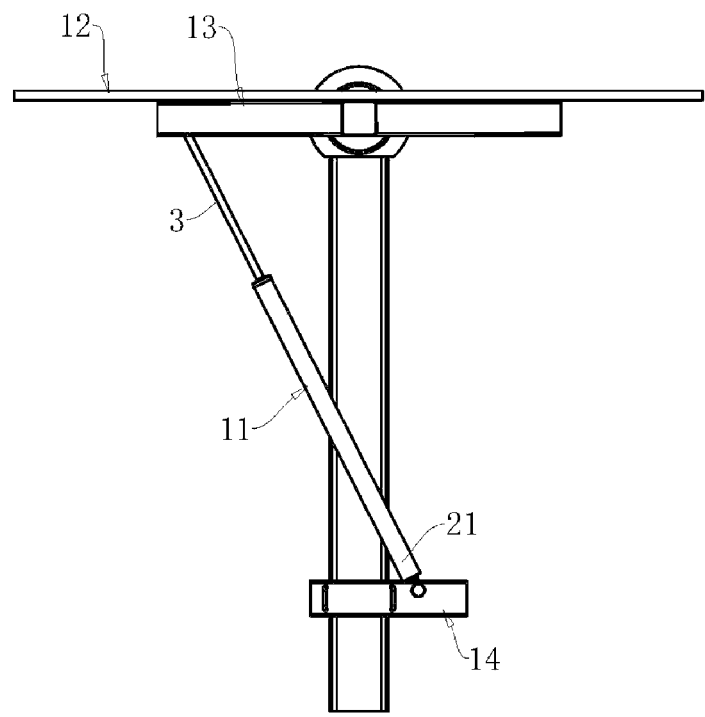
FIG. 1 is a schematic diagram of the positional relationship between a solar photovoltaic panel and a self-variable force hydraulic damper before starting up.

An embodiment of the present application discloses a self-variable force hydraulic damper 11 applied to a solar photovoltaic power generation system. Referring to FIG. 1, the front end of a piston rod 3 in the self-variable force hydraulic damper 11 is hinged to a solar panel fixed frame 13 where the solar photovoltaic panel 12 is mounted, and an outer cylinder 21 of the self-variable force hydraulic damper 11 is hinged to a base bracket 14. The solar photovoltaic power generation system is also provided with a drive mechanism that drives the solar panel fixed frame 13 to rotate regularly, so that the solar photovoltaic panel 12 can always move towards the direction of the sun to improve the power generation efficiency of the solar photovoltaic panel 12.

Referring to FIG. 1, it is a schematic diagram of the positional relationship between the solar photovoltaic panel 12 and the self-variable force hydraulic damper 11 before starting up. At this time, the solar photovoltaic panel 12 is a horizontal panel layout.

Figure 2:
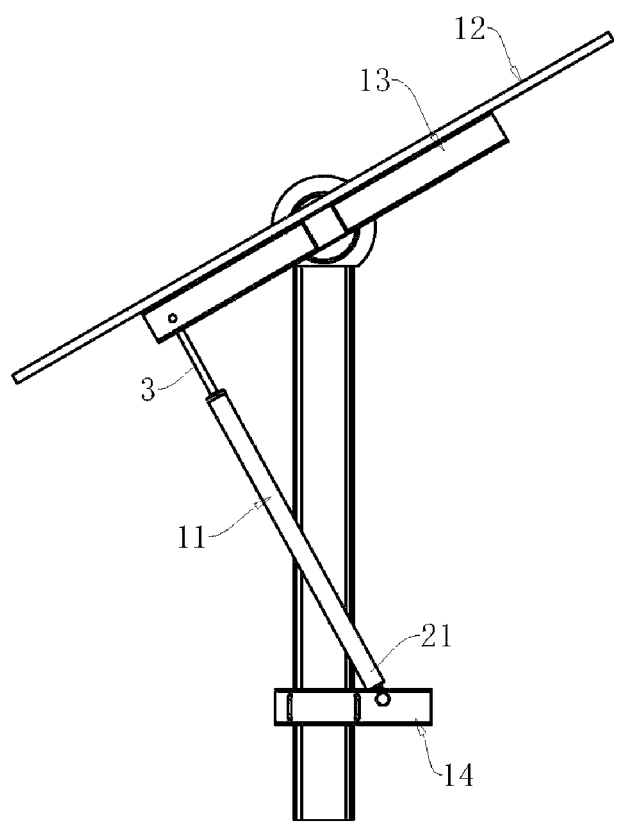
FIG. 2 is a schematic diagram of the positional relationship between the solar photovoltaic panel and the self-variable force hydraulic damper when the sun just rises after being started.

Referring to FIG. 2, it is a schematic diagram of the positional relationship between the solar photovoltaic panel 12 and the self-variable force hydraulic damper 11 when the sun just rises after it is started up. At this time, the solar photovoltaic panel 12 is directed towards the direction in which the sun rises, and the acute angle between the solar photovoltaic panel 12 and the horizontal plane is 60°.

Figure 3:
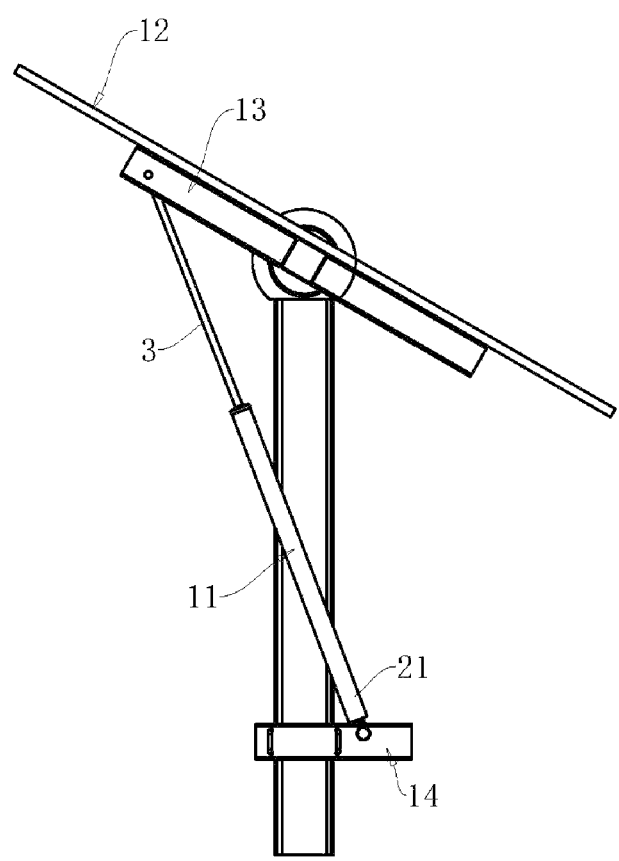
FIG. 3 is a schematic diagram of the positional relationship between the solar photovoltaic panel and the self-variable force hydraulic damper after the sun sets west.

Referring to FIG. 3, it is a schematic diagram of the positional relationship between the solar photovoltaic panel 12 and the self-variable force hydraulic damper 11 after the sun sets west. At this time, the solar photovoltaic panel 12 is directed towards the direction in which the sun sets down, and the acute angle between the solar photovoltaic panel 12 and the horizontal plane is 60°.

Figure 4:
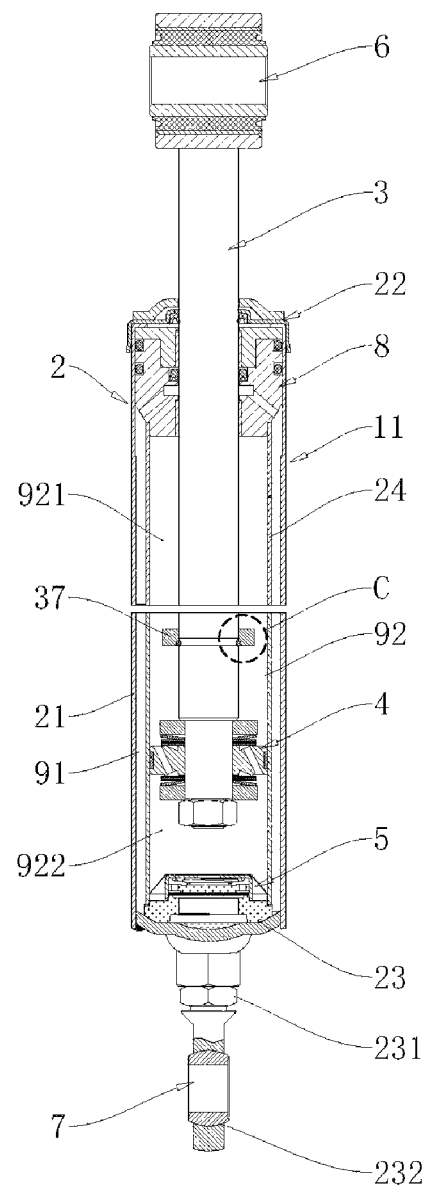
FIG. 4 is a schematic structural view of the self-variable force hydraulic damper.

Referring to FIG. 4, the self-variable force hydraulic damper 11 includes a housing assembly 2, a piston rod 3, a piston assembly 4, a compression valve 5, a ring bushing assembly 6 and a bearing assembly 7.

Referring to FIG. 4, the housing assembly 2 includes an outer cylinder 21, a front cover 22 mounted at the front end of the outer cylinder 21, a bottom cover 23 mounted at the tail end of the outer cylinder 21, a guide seal assembly 8 for guiding the piston rod 3 mounted at the front end of the outer cylinder 21, and a working cylinder 24 located within the outer cylinder 21 and cooperated with the piston assembly 4.

Figure 5:
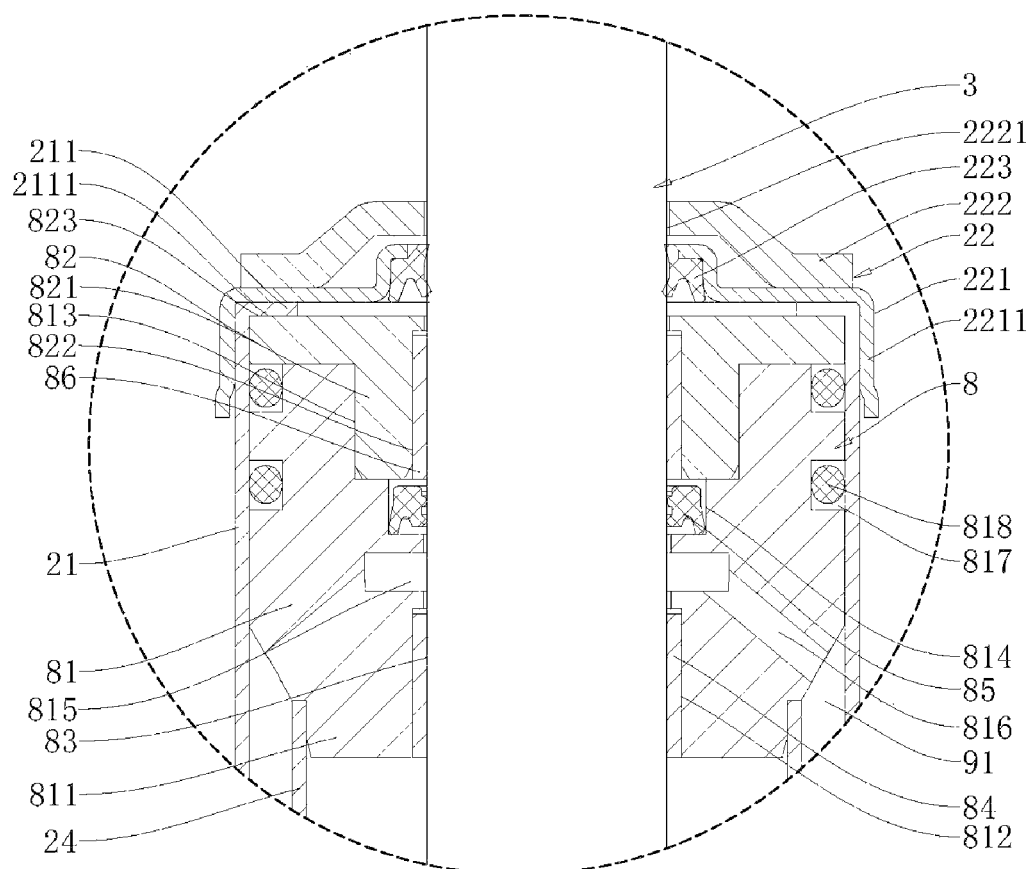
FIG. 5 is an association diagram of a front cover, an outer cylinder, a guide seal assembly and a piston rod.

Referring to FIG. 5, the outer cylinder 21 is a hollow cylindrical cylinder. The front end of an outer cylinder 21 is provided with a limit flange 211 that is turned inward and perpendicular to the axis of the outer cylinder 21. The inner side of the limit flange 211 is formed with a first limiting plane 2111 for the guide seal assembly 8 to be abutted so as to be limited.

Referring to FIG. 5, the front cover 22 includes a first cover body 221 and the second cover body 222. The first cover body 221 has a fixed ring 2211 sleeved at the outer wall at the front end of the outer cylinder 21. The fixed ring 2211 is fixed to the front cover 22 through the welding. A dust ring 223 is formed between the inner side of the first cover body 221 and the piston rod 3. The inner ring end face of the dust ring 223 has a dust lip for abutting against the outer wall of the piston rod 3.

Referring to FIG. 5, the second cover body 222 is fixed to the side of the first cover body 221 facing away from the outer cylinder 21 by welding, and has the second through hole 2221 for the extension of the piston rod 3. Here, the piston rod 3 and the second through hole 2221 form a clearance fit. The setting of the second cover body 222 can protect the dust ring 223 mounted within the first cover body 221, reducing the probability of damage to the dust lip of the dust ring 223 due to external impact.

Referring to FIG. 4, a bottom cover 23 is fixed to the bottom end of the outer cylinder 21 by welding, and sealingly closes the bottom opening of the outer cylinder 21. The bottom cover 23 is fixed to a lower connecting portion 231 at the center of the surface facing away from the outer cylinder 21 by welding, The axis of the lower connecting portion 231 coincides with the axis of the outer cylinder 21, and the lower connecting portion 231 also has a bearing mount hole 232 for mounting a bearing assembly 7. When mounting the self-variable force hydraulic damper described above, the bearing assembly 7 is mounted at the base bracket 14 of the solar photovoltaic power generation system (referring to FIG. 1).

Referring to FIG. 4, a compression valve 5 is mounted at the side of the bottom cover 23 toward the inner cavity of the outer cylinder 21. A working cylinder 24 is supported between the compression valve 5 and the guide seal assembly 8. The inner cavity of the outer cylinder 21 is divided into an oil storage cavity 91 located between the outer cylinder 21 and the working cylinder 24 and a work cavity 92 in the working cylinder. Here, the compression valve 5 is used to control the balance of the oil pressure in the work cavity 92 and the oil pressure in the oil storage cavity 91.

Referring to FIG. 5, the guide seal assembly 8 has a first through hole 83 for the extension of the piston rod 3, and is used to guide and seal the sliding of the piston rod 3 to ensure the sliding accuracy of the piston rod 3 and reduce the probability of leakage of the hydraulic oil in the housing assembly 2. The guide seal assembly 8 sequentially includes a first guide 81 and the second guide 82 along the direction close to the limit flange 211.

The first guide 81 has a first insert portion 811 inserted within the working cylinder 24, and a first guide groove 812 is provided on the end face of the first insert portion 811. A first guide sleeve 84 cooperated with the piston rod 3 is mounted in the first guide groove 812. A positioning insert groove 813 is provided on the end of the first guide 81 directed towards the second guide 82, and the bottom of the positioning insert groove 813 is provided with an oil seal ring groove 814 within which an oil seal 85 is mounted.

The first guide 81 is provided with an oil return ring groove 815 between the first guide groove 812 and the oil seal ring groove 814, and also with an oil return hole 816 communicating the oil return ring groove 815 and the oil storage cavity 91. The setting of the oil return ring groove 815 and the oil return hole 816 can make the hydraulic oil scraped off by the oil seal 85 flow into the oil storage cavity 91, which helps the hydraulic oil to be recycled.

The outer wall of the first guide 81 is also arranged with two seal ring grooves 817 at intervals, and a seal ring 818 that cooperates with the outer cylinder 21 is provided in the two seal ring grooves 817.

The second guide 82 has the second insert portion 821 inserted within the positioning insert groove 813. The second guide groove 822 is provided on the end face of the second insert portion 821 towards the first guide 81. The second guide sleeve 86 cooperated with the piston rod 3 is mounted in the second guide groove 822. The second guide 82 further has the second limiting plane 823 that cooperates with the first limiting plane 2111.

Referring to FIGS. 4 and 5, the piston rod 3 is a cylindrical metal cylinder, and sealingly and slidably mounted in the first through hole 83 of the guide seal assembly 8. The ring bushing assembly 6 is located at the top end of the piston rod 3. When the self-variable force hydraulic damper described above is mounted, the ring bushing assembly 6 is mounted at the solar panel fixed frame 13 of the solar photovoltaic power generation system (referring to FIG. 1).

Figure 6:
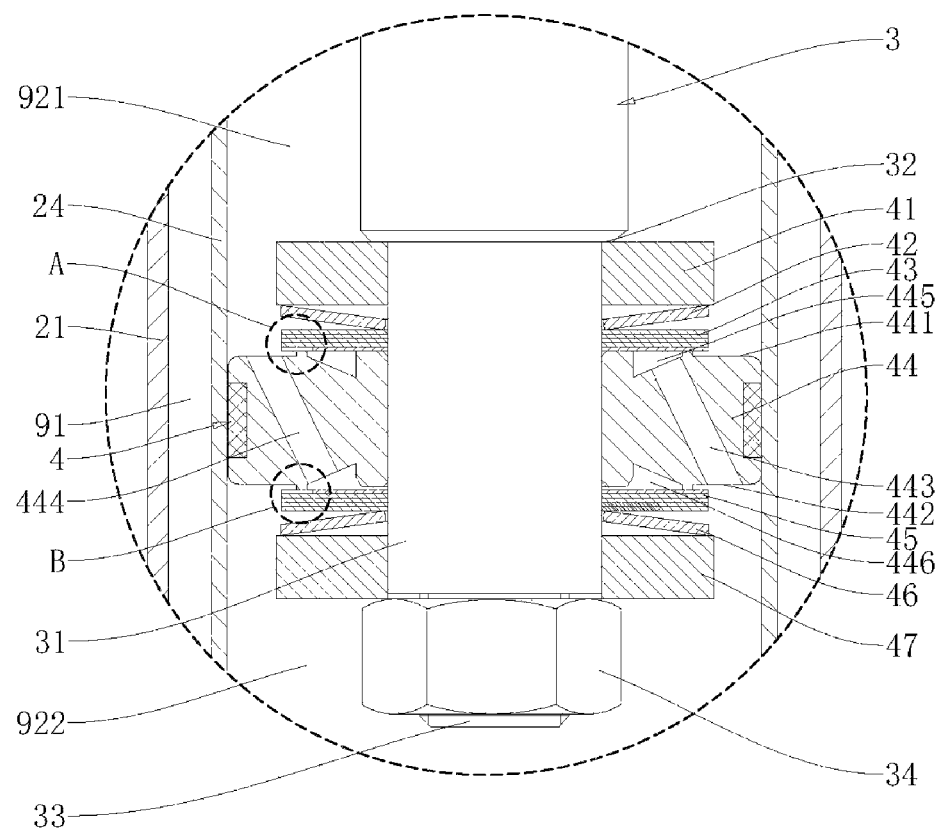
FIG. 6 is an association diagram of an outer cylinder, a working cylinder, a piston rod and a piston assembly.

Referring to FIG. 6, the tail end of the piston rod 3 has a mounting section 31 for mounting the piston assembly 4. The outer diameter of the mounting section 31 is smaller than the overall outer diameter of the piston rod 3. A stepped surface 32 is formed at the top end of the mounting section 31. The bottom end of the mounting section 31 is also coaxially provided with a blot section 33 with an outer diameter smaller than that of the mounting section 31, and a mounting nut 34 that presses the piston assembly 4 against the stepped surface 32 is mounted at the blot section 33.

Referring to FIG. 6, the piston assembly 4 along the mounting section 31 mounted to the piston rod 3 sequentially includes a first washer 41, a first disc spring 42, a first valve plate 43, the variable displacement piston 44, the second valve plate 45, the second disc spring 46 and the second washer 47. The first washer 41 and the second washer 47 are ring-shaped rubber gaskets, so that the piston assembly 4 can be better fixed to the tail end of the piston rod 3.

Here, the thickness of the piston assembly 4 is greater than the length of the mounting section 31. When the mounting nut 34 is mounted in the blot section 33, the mounting nut 34 urges a pre-deformed amount of the first disc spring 42 and the second disc spring 46, and the piston assembly 4 has a pre-tightened internal stress, so that the first valve plate 43 and the second valve plate 45 are pressed on the end face of the variable displacement piston 44.

Referring to FIGS. 4 and 6, when the piston assembly 4 is mounted at the tail end of the piston rod 3, the piston assembly 4 divides the work cavity 92 into the first oil cavity 921 and the second oil cavity 922. Here, the first oil cavity 921 is located at the side close to the front cover 22; the second oil cavity 922 is located at the side close to the bottom cover.

The variable displacement piston 44 has a first end face 441 and the second end face 442. The first end face 441 is the end face of the variable displacement piston 44 close to the first valve plate 43, and the second end face 442 is the end face of the variable displacement piston close to the second valve plate 45. The variable displacement piston 44 has a first flow hole 443 and a second flow hole 444 that penetrate the first end face 441 and the second end face 442 respectively. Here, the first flow hole 443 and the second flow hole 444 each is an oblique hole. The first flow hole 443 is arranged obliquely along a direction from the first end face 441 to the second end face 442 towards the direction of the outer wall of the variable displacement piston 44. The second flow hole 444 is arranged obliquely along a direction from the second end face 442 to the first end face 441 towards the direction of the outer wall of the variable displacement piston 44. Here, the numbers of the first flow hole 443 and the second flow hole 444 can be designed and embodied according to requirements. In this embodiment, the variable displacement piston 44 has one first flow hole 443 and two second flow holes 444.

The variable displacement piston 44 is provided with a first ring groove 445 on the first end face 441, and the top of the first flow hole 443 is communicated with the inner wall of the first ring groove 445. The variable displacement piston 44 also is provided with the second ring groove 446 on the second end face 442, and the bottom of the second flow hole 444 is communicated with the inner wall of the second ring groove 446.

Figure 7:
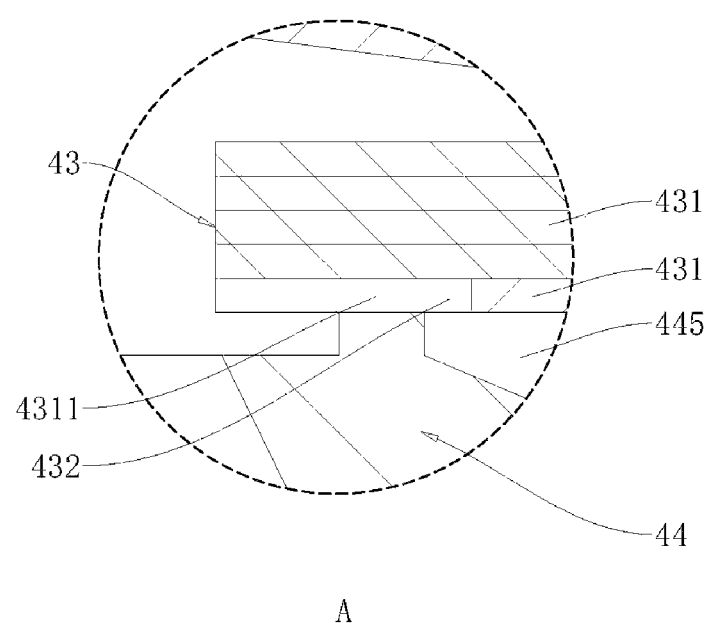
FIG. 7 is a partial enlarged schematic view of part A in FIG. 6.

Referring to FIGS. 6 and 7, the first valve plate 43 closes the first ring groove 445, and does not close the opening of the second flow hole 444 on the first end face 441. The first valve plate 43 is formed by at least two stacked first individual plates 431. In this embodiment, the number of the first individual plates 431 in the first valve plate 43 is five. Here, the first individual plate 431 attaching with the variable displacement piston 44 among the first individual plates 431 is provided with a first throttle notch 4311, so that a first throttle groove 432 that communicates with the first ring groove 445 is formed in the first individual plate 431.

Figure 8:
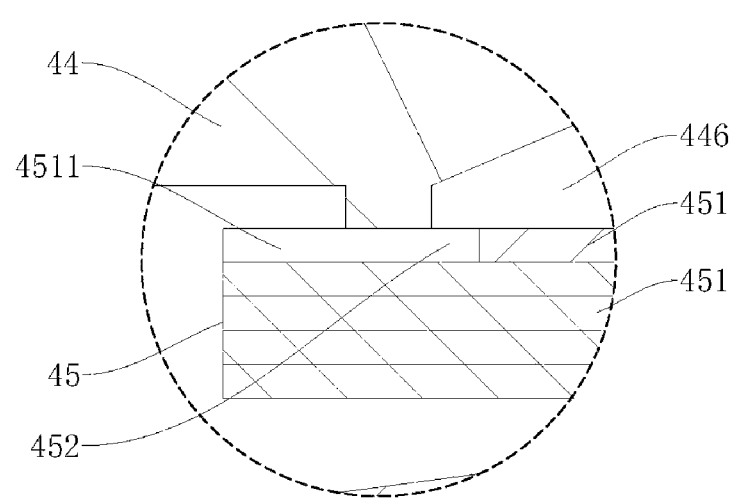
FIG. 8 is a partial enlarged schematic view of part B in FIG. 6.

Referring to FIGS. 6 and 8, the second valve plate 45 closes the second ring groove 446, and does not close the opening of the first flow hole 443 on the second end face 442. The second valve plate 45 is formed by at least two stacked second individual plates 451. In this embodiment, the number of the second individual plates 451 in the second valve plate 45 is five. Here, the second individual plate 451 attaching with the variable displacement piston 44 among the second individual plates 451 is provided with a second throttle notch 4511, so that a second throttle groove 452 that communicates with the first ring groove 445 is formed in the second individual plates 451.

Referring to FIG. 6, the first disc spring 42 is supported between the first valve plate 43 and the first washer 41, and presses the first valve plate 43 against the first end face 441 of the variable displacement piston 44. Here, the cone surface of the first disc spring 42 is set towards the variable displacement piston 44 and combined with the first valve plate 43 to form a first one-way throttle structure at the first end face 441 of the variable displacement piston 44.

The second disc spring 46 is supported between the second valve plate 45 and the first washer 41, and presses the second valve plate 45 against the second end face 442 of the variable displacement piston 44. The cone surface of the second disc spring 46 is set towards the variable displacement piston 44, and forms a second one-way throttle structure at the second end face 442 of the variable displacement piston.

Figure 9:
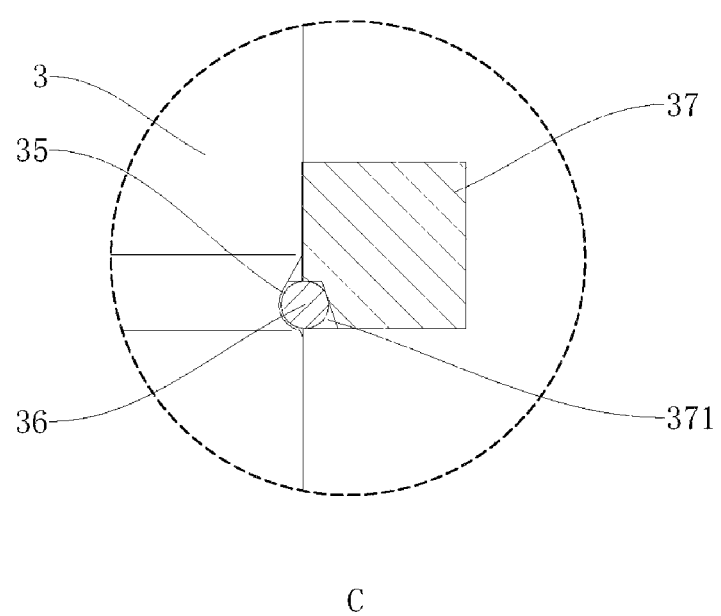
FIG. 9 is a partial enlarged schematic view of part C in FIG. 6.

Referring to FIGS. 4 and 9, the piston rod 3 is also provided with a limit ring 37 above the piston assembly 4. The piston rod 3 is provided with a limit ring groove 35, and a limit rubber ring 36 is mounted at the limit ring groove 35. A snap ring groove 371 for the snapping of the limit rubber ring 36 is provided at the end face of the limit ring 37 towards the piston assembly 4.

With reference to FIGS. 1-9, the implementation principle of the self-variable force hydraulic damper according to an embodiment of the present application 11 is as follows. After the self-variable force hydraulic damper 11 is mounted at the solar photovoltaic power generation system, the front end of the piston rod 3 of the self-variable force hydraulic damper 11 is hinged to the solar panel fixed frame 13 through the ring bushing assembly 6, and the bottom cover 23 of the self-variable force hydraulic damper 11 is hinged to the base bracket 14 through the bearing assembly 7. The piston rod 3 of the self-variable force hydraulic damper 11 moves synchronously with the rotation of the solar photovoltaic panel 12, and provides the support and damping force for the solar photovoltaic panel 12.

According to the wind speed of the environment where the solar photovoltaic panel 12, the self-variable force hydraulic damper 11 mentioned above will provide three support modes, namely a windless mode, a strong wind mode and a super wind mode.

When the solar photovoltaic panel 12 is in a windless or breezy environment, the solar photovoltaic panel 12 receives very little wind pressure, and the solar photovoltaic panel 12 rotates at a uniform speed under the action of a drive mechanism. At this time, the linear velocity of the piston rod 3 is low, and the general linear velocity is kept at 0.005- 0.010 m/s, so that the self-variable force hydraulic damper 11 is in the windless wind mode. At this time, the first valve plate 43 and the second valve plate 45 in the piston assembly 4 remains undeformed, and the first disc spring 42 and the second disc spring 46 both maintain a deformation amount in a pre-compressed state. When the piston rod 3 is compressed, the hydraulic oil passes through the first flow hole 443, the first ring groove 445 and the first throttle groove 432 so as to circulate from the second oil cavity 922 to the first oil cavity 921; and when the piston rod 3 is stretched, the hydraulic oil passes through the second flow hole 444, the second ring groove 446 and the second throttle groove 452 so as to flow from the first oil cavity 921 to the second oil cavity 922.

When the solar photovoltaic panel 12 is in the strong wind environment, the solar photovoltaic panel 12 is under the pressure given by the strong wind, the piston rod 3 is subjected to the impact load force given by the solar panel fixed frame 13, and the piston rod 3 and the piston assembly 4 move within the housing assembly 2. Due to the damping force provided by the self-variable force hydraulic damper to the solar panel fixed frame 13 are related to the moving speed of the piston rod 3, the faster the piston rod 3 moves, the greater the damping force provided by the self-variable force hydraulic damper to the solar panel fixed frame 13 is. At this time, the linear velocity of the piston rod 3 is also lower, so that the self-variable force hydraulic damper 1 is in the strong wind mode. When the piston rod 3 is compressed, the hydraulic oil opens the first valve plate 43, so that the edge area of the first valve plate 43 tilts away from the first end face 441 and forms a gap with the first end face 441, and the hydraulic oil flows out through the gap. When the piston rod 3 is stretched, the hydraulic oil opens the second valve plate 45, so that the edge area of the second valve plate 45 tilts away from the second end face 442 and forms a gap between it and the second end face 442, and the hydraulic oil flows out through the gap. When the self-variable force hydraulic damper 11 is in the strong wind mode, the edge area of both the first valve plate 43 and the second valve plate 45 may tilt and deform under the impact of the hydraulic oil to meet the displacement of the piston assembly 4 and the piston rod 3 in the self-variable force hydraulic damper 11; the first disc spring 42 and the second disc spring 46 each maintain the deformation amount in a pre-compressed state.

When the solar photovoltaic panel 12 is in the super wind environment, the solar photovoltaic panel 12 is under the pressure of super strong wind, and the piston rod 3 is subjected to the impact load force given by the solar panel fixed frame 13, so that the piston assembly 4 is moved in the working cylinder 24, and the linear velocity of the piston rod 3 is higher, so that the self-variable force hydraulic damper I1 is in the strong wind mode. At this time, the first disc spring 42 and the second disc spring 46 are compressed to be completely deformed, and the first valve plate 43 and the second valve plate 45 are pressed against the variable displacement piston 44, so that the hydraulic oil can only circulate through the first throttle groove 432 and the second throttle groove 452. Due to the damping force provided by the hydraulic damper is proportional to the movement speed of the piston rod, that is, the faster the piston rod of the hydraulic damper moves, the greater the damping force provided by the hydraulic damper is. When the first disc spring 42 and the second disc spring 46 mentioned above after deformation press the first valve plate 43 and the second valve plate 45 against the variable displacement piston 44, the self-variable force hydraulic damper 11 provides a larger and sudden rising damping force, so that the solar photovoltaic panel 12 can be locked by the self-variable force hydraulic damper 11 in the super wind environment, and the purpose of quickly attenuating the severe vibration of the solar photovoltaic panel 12 is achieved.

The above are all preferred embodiments of the present application, and do not limit the scope of protection of the present application accordingly. Therefore, all equivalent changes made in accordance with the structure, shape, and principle of the present application shall be covered by the scope of protection of the present application.

What is claimed is:

1. A self-variable force hydraulic damper for a solar photovoltaic power generation system comprising a housing assembly, a piston rod and a piston assembly, wherein: the piston assembly is mounted on the piston rod and sequentially comprises a first washer, a first disc spring, a first valve plate, a variable displacement piston, a second valve plate, a second disc spring and a second washer; the variable displacement piston has a first end face and a second end face, and is further provided with a first flow hole and a second flow hole that penetrate the first end face and the second end face respectively; the first valve plate under the action of the first disc spring is pressed against the first end face, and the first valve plate closes the first flow hole and does not close the second flow hole; the second valve plate under the action of the second disc spring is pressed against the second end face, and the second valve plate closes the second flow hole and does not close the first flow hole;
   a first tapered surface of the first disc spring is directed towards the first valve plate; a second tapered surface of the second disc spring is directed towards the second valve plate;
   a first throttle groove for a fluid within the first flow hole flowing out is provided on the first valve plate; a second throttle groove for a fluid within the second flow hole flowing out is provided on the second valve plate;
   when a solar photovoltaic panel is in a super wind environment, the first disc spring and the second disc spring are compressed to be completely deformed, and the first valve plate and the second valve plate are pressed against the variable displacement piston, so that the hydraulic oil only circulates through the first throttle groove and the second throttle groove.

2. The self-variable force hydraulic damper for a solar photovoltaic power generation system according to claim 1, wherein:
   the first valve plate is formed by at least two stacked first individual plates, the first individual plate attaching with the variable displacement piston among the first individual plates is provided with a first throttle notch and formed with the first throttle groove; the second valve plate is formed by at least two stacked second individual plates, the second individual plate attaching with the variable displacement piston among the second individual plates is provided with a second throttle notch and formed with the second throttle groove.

3. The self-variable force hydraulic damper for a solar photovoltaic power generation system according to claim 1, wherein:
   the first flow hole is an oblique hole and arranged inclinedly outwardly along a direction from the first end face to the second end face; the second flow hole is further an oblique hole and arranged inclinedly outwardly along a direction from the second end face to the first end face.

4. The self-variable force hydraulic damper for a solar photovoltaic power generation system according to claim 3, wherein:
   the variable displacement piston is provided with a first ring groove on the first end face, the first flow hole is communicated with the inner wall of the first ring groove, the first throttle groove is communicated with the first ring groove, and the first valve plate closes the first ring groove; the variable displacement piston is provided with a second ring groove on the second end face, the second flow hole is communicated with the inner wall of the second ring groove, the second throttle groove is communicated with the second ring groove, and the second valve plate closes the second ring groove.

5. The self-variable force hydraulic damper for a solar photovoltaic power generation system according to claim 1, wherein:
   the tail end of the piston rod has a mounting section for mounting the piston assembly, a stepped surface is formed at the top end of the mounting section, the piston rod is further provided with a mounting nut for pressing the piston assembly on the stepped surface.

6. The self-variable force hydraulic damper for a solar photovoltaic power generation system according to claim 1, wherein:
   the housing assembly comprises an outer cylinder, a bottom cover mounted at the tail end of the outer cylinder, a front cover mounted at the front end of the outer cylinder, a guide seal assembly for guiding the piston rod mounted at the front end of the outer cylinder, and a working cylinder located within the outer cylinder and cooperated with the piston assembly; the lower end of the working cylinder is mounted with a compression valve, and an oil storage cavity is formed between the working cylinder and the outer cylinder; the guide seal assembly has a first through hole for the extension of the piston rod, and is sequentially provided with a first guide sleeve, an oil seal and a second guide sleeve at the inner wall of the first through hole along the extension direction of the piston rod.

7. The self-variable force hydraulic damper for a solar photovoltaic power generation system according to claim 6, wherein:
   the guide seal assembly is further provided with an oil return ring groove between the first guide sleeve and the oil seal, and the guide seal assembly is further provided with an oil return hole communicating the oil return ring groove and the oil storage cavity.

8. The self-variable force hydraulic damper for a solar photovoltaic power generation system according to claim 6, wherein:
   the guide seal assembly comprises a first guide sealingly mounted at an inner cavity of the outer cylinder and a second guide mounted at the inner cavity of the outer cylinder and located outside of the first guide; the first guide has a first insert portion inserted within the working cylinder, and a first guide groove for mounting the first guide sleeve is provided on the end face of the first insert portion; a positioning insert groove is provided on the end of the first guide directed towards the second guide and having the second guide provided, and the bottom of the positioning insert groove is provided with an oil seal ring groove for mounting the oil seal; the second guide has the second insert portion inserted within the positioning insert groove, and the second guide groove for mounting the second guide sleeve is provided on the end face of the second insert portion towards the first guide.

* * * * *